Jan. 14, 1947.  E. D. ANDREWS  2,414,185
APPARATUS FOR TREATING STARCH-CONTAINING MATERIALS
Filed April 28, 1944  9 Sheets-Sheet 1

INVENTOR
EDWARD D. ANDREWS
ATTORNEYS

Jan. 14, 1947.  E. D. ANDREWS  2,414,185
APPARATUS FOR TREATING STARCH-CONTAINING MATERIALS
Filed April 28, 1944  9 Sheets-Sheet 5

INVENTOR
EDWARD D. ANDREWS
BY
ATTORNEYS

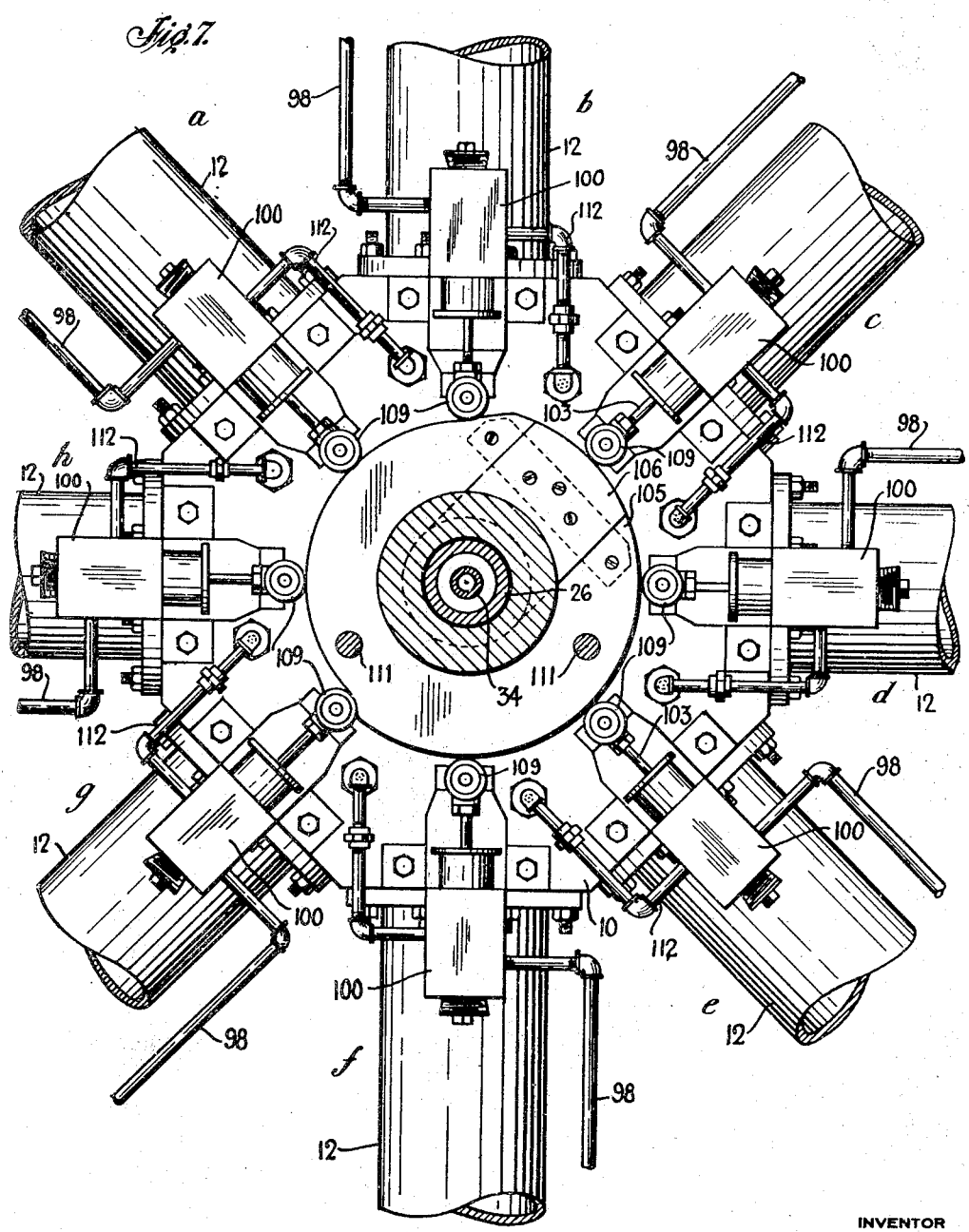

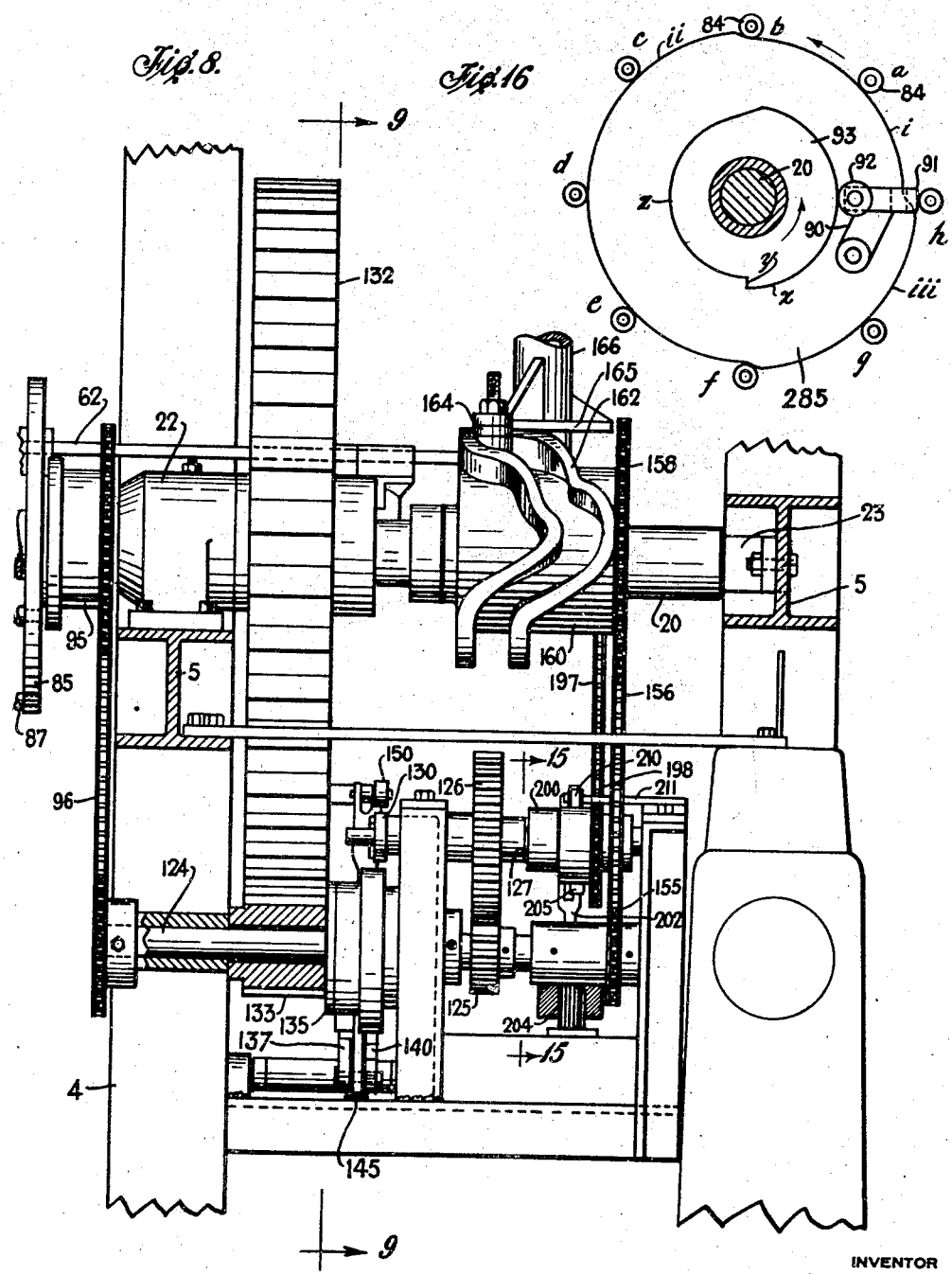

Jan. 14, 1947.   E. D. ANDREWS   2,414,185
APPARATUS FOR TREATING STARCH-CONTAINING MATERIALS
Filed April 28, 1944   9 Sheets-Sheet 8
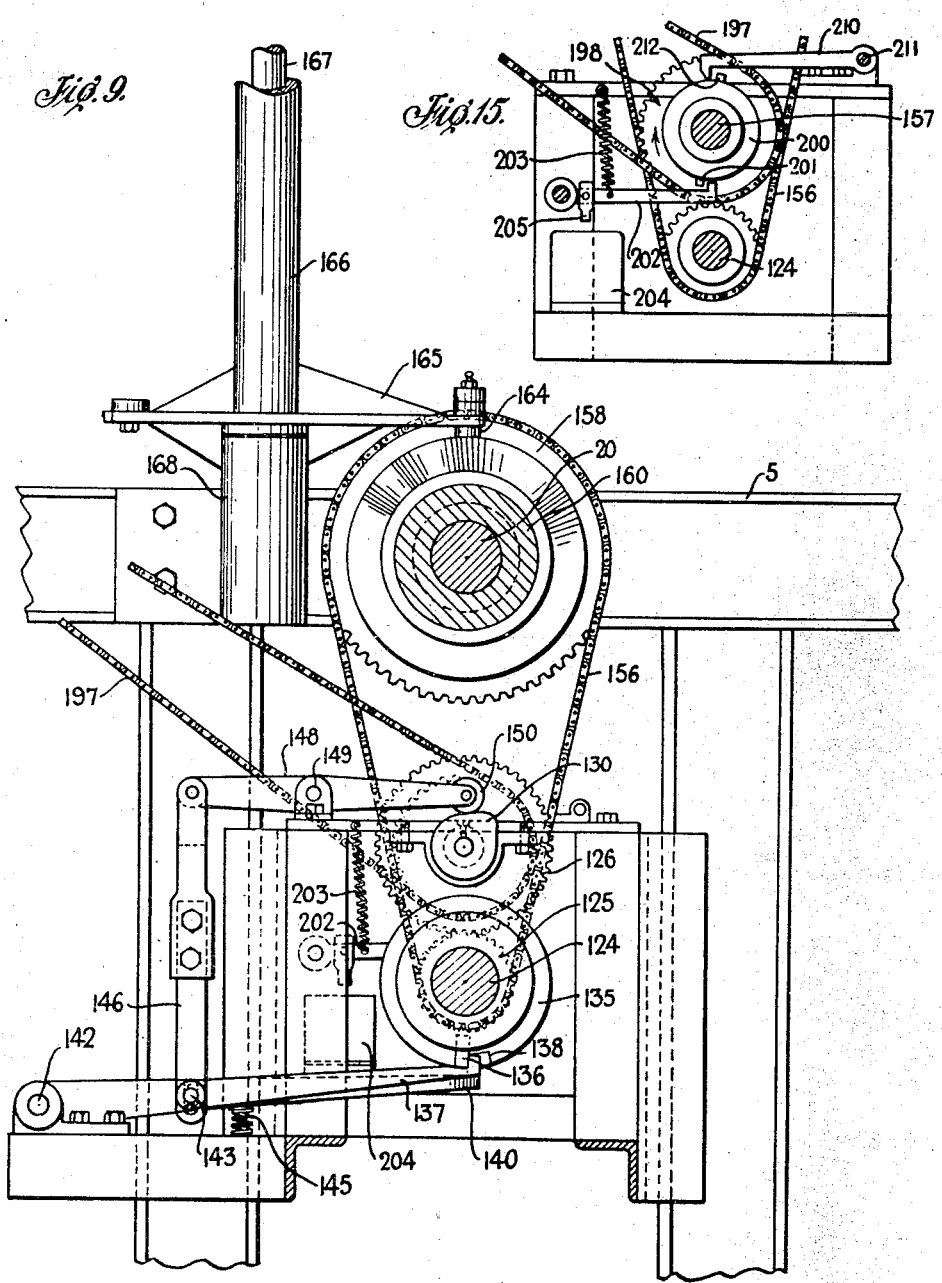
INVENTOR
EDWARD D. ANDREWS
BY
ATTORNEYS

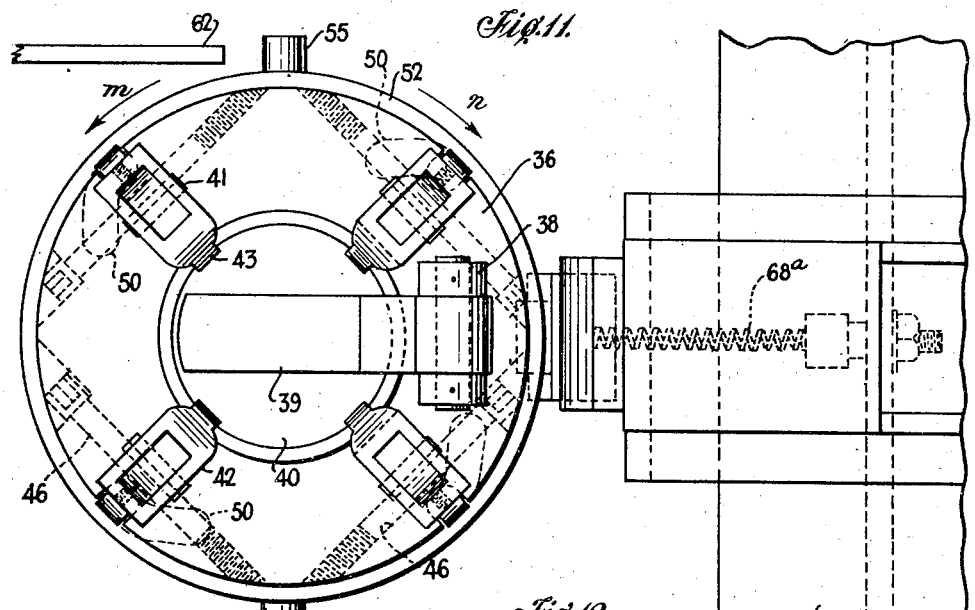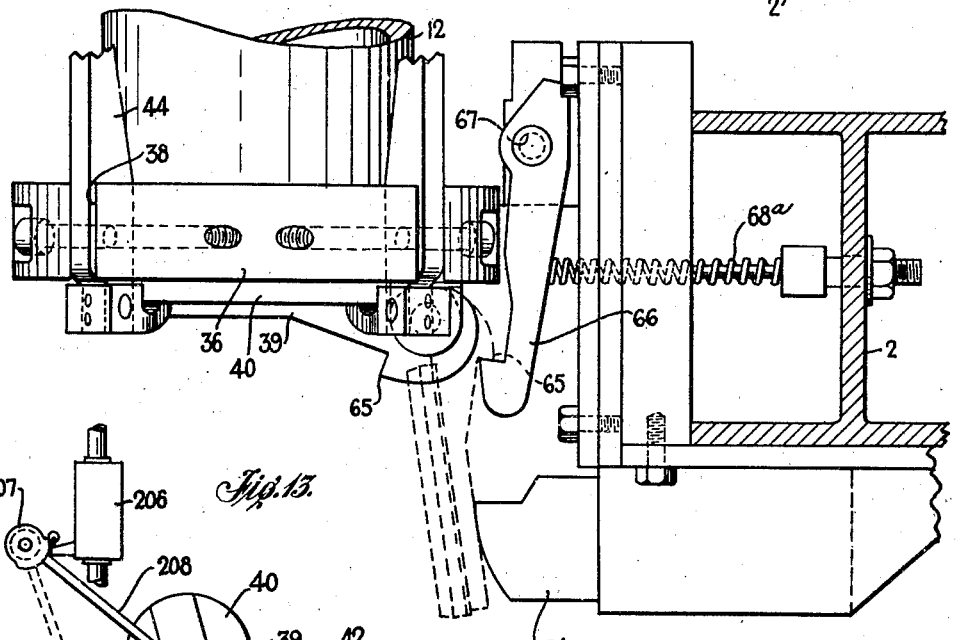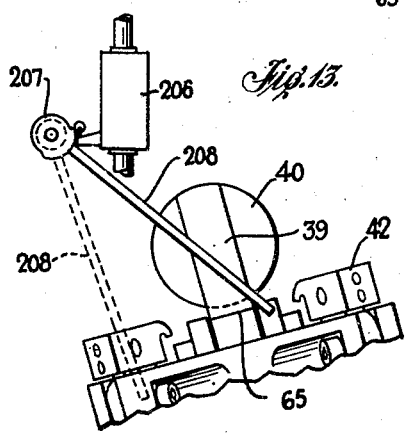

Patented Jan. 14, 1947

2,414,185

UNITED STATES PATENT OFFICE 2,414,185

APPARATUS FOR TREATING STARCH-CONTAINING MATERIALS

Edward D. Andrews, Akron, Ohio, assignor to The Quaker Oats Company, Chicago, Ill., a corporation of New Jersey Application April 28, 1944, Serial No. 533,228

32 Claims. (Cl. 99—238.5)

The present invention relates to the art of puffing, exploding, or pressure cooking cereals, grains, vegetables and other starch-containing materials in the manufacture of various types of food products. It has as its primary object the designing of a thoroughly practical machine such as illustrated herein by which the pressure cooking and exploding of these materials may be carried on automatically and continuously. With a slight modification the same machine may be used for the manufacture of puffed products.

While attempts have been made heretofore to devise machines in which these operations might be carried on in an automatic or semi-automatic manner, those machines have not been commercially successful and the art has almost universally employed the old single gun type of apparatus. The machine shown herein enables the treatment of grains or vegetables of various types to be performed automatically and continuously, thereby substantially reducing the labor and other operating costs and increasing production.

The machine comprises primarily a set of pressure chambers or "guns" mounted upon an intermittently rotated turret or central drum. At one station or position, the cover of the gun is raised and a charge of the uncooked material is supplied to the gun. During its travel to the next station, the cover is lowered onto the open end of the gun and at the next station the cover is securely locked in closed position. Steam under pressure is then admitted to the chamber and allowed to circulate through the contents of the chamber and out through a discharge valve while the gun is traveling through succeeding stations. At some point in the travel, dependent upon the material being treated and the processing procedure, the outlet for the steam is closed and the pressure is permitted to build up in the gun. As the gun reaches its last station, the clamping means for the cover is suddenly released and the contents are exploded and discharged from the gun. At some time before the cover is released, the inlet valve is closed.

The machine shown herein may be used for treatment of all types of grains, cereals or other foods which are adapted to the puffing or pressure cooking process. The valves which permit the steam to circulate through each gun or chamber are controlled by cams which are either adjustable or readily replaceable so that the relative periods for circulation of the steam and building up the pressure prior to the exploding point may be varied to adapt the machine to the treatment of any type of food product. The particular arrangement of the cams shown in the earlier views is employed in the treatment of navy beans preparatory to the manufacture of soup. For the treatment of other cereals or grains, the division of the cycle between the circulation of the steam through the materials, known as the "steaming" period and the pressure period, may be changed which will require only the replacement or adjustment of the cams which control the valves for the several chambers. Also, in treating certain materials the total time for steaming and pressure may be longer or shorter than for other materials. This is taken care of by changing the speed of the drive mechanism.

For the puffing of wheat, rice and the like, it is desirable to provide for two different pressure periods in the earlier of which a lower steam pressure is supplied and in the later of which the pressure is increased to a point where adequate pressure is obtained to secure a puffed product. A simple method of doing this is shown herein.

One of the features of the invention is the provision of means for closing the inlet valve at almost the instant at which the gun closure is released, for it is highly desirable in treating many types of materials to keep the inlet valve open as close as possible to the point when the pressure within the chamber is to discharge the cooked and puffed contents of the chamber. Another feature of the invention is the means by which the steam is constantly circulated through the several chambers in which the material is being treated. This provision for circulating the steam continuously through the contents of the guns during the steaming period is a substantial improvement over prior art devices which provided for intermittent steaming only.

The invention also provides a thoroughly practical and operative combination of elements which will insure the continuous and economical production of food products.

Many other objects and advantages are attained in the operation of the apparatus of the present invention. It will be understood that while the invention is shown in detail in its present best known and preferred forms, variations and modifications may be made therein without departing from the essential features of the invention or sacrificing its benefits.

Figure 5:
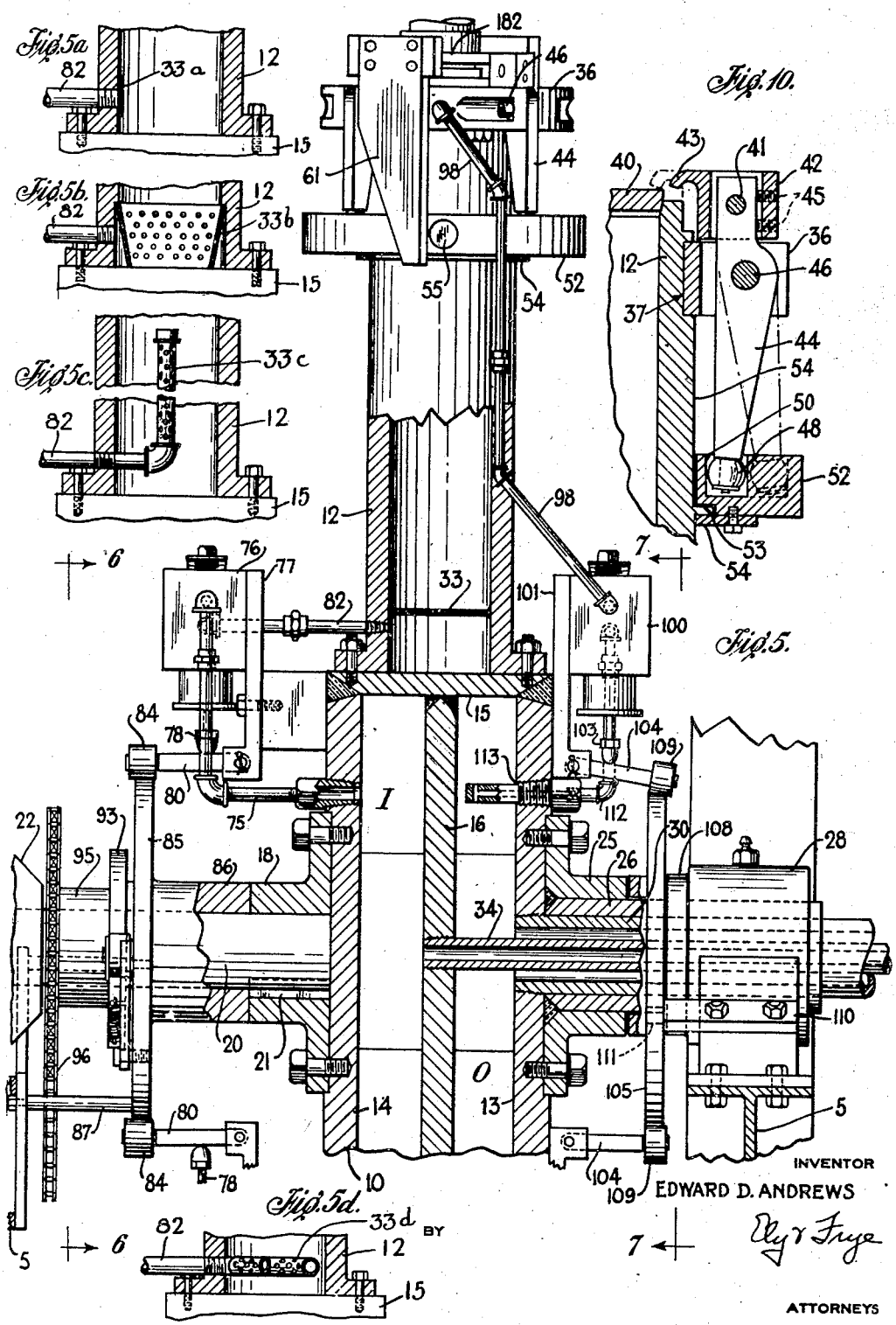
Fig. 5 is an enlarged detail sectional view taken along the axis of the steam drum.
Figure 6:
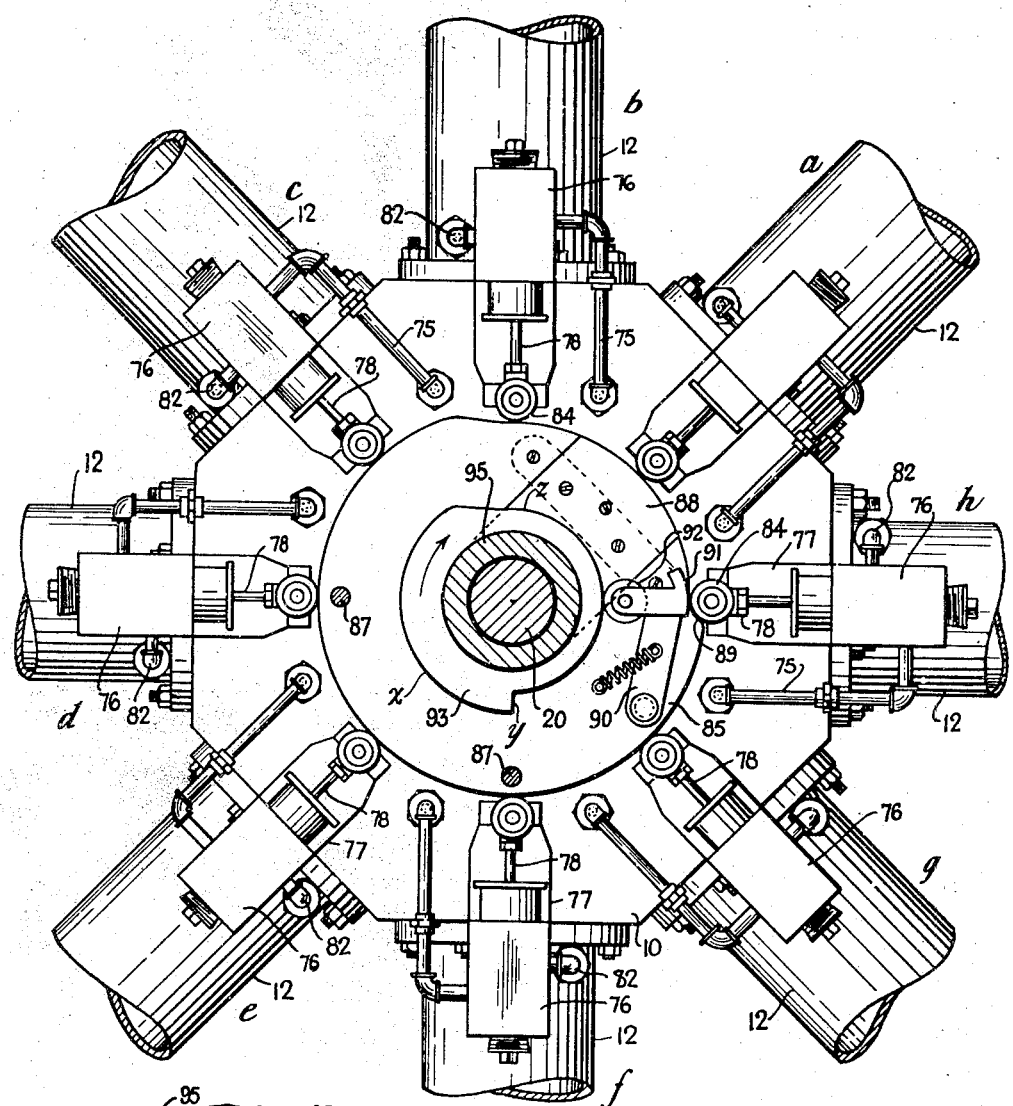
Figure 6A:
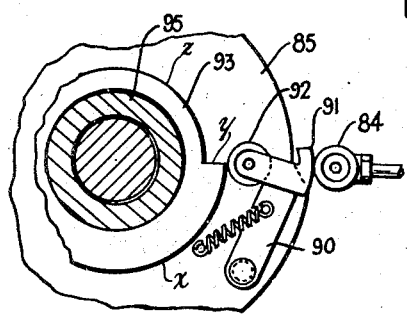

Figs. 5a to 5d inclusive, show alternative steam inlet arrangements;

Fig. 6 is a section on the line 6—6 of Fig. 5 showing the cams which control the several steam inlet valves for the guns;

Fig. 6a is a detail view showing the position of the parts at the instant the inlet valve is to be closed;

Fig. 7 is a section on the line 7—7 of Fig. 5 showing the cam for controlling the several outlet valves;

Fig. 8 is a side elevation of the drive mechanism;

Fig. 9 is a sectional view on the line 9—9 of Fig. 8;

Fig. 10 is a detail sectional view through one of the locking levers for the gun closure;

Fig. 11 is a front view looking at a gun in its discharge position;

Fig. 12 is a plan view of the parts shown in Fig. 11;

Fig. 13 is a detail showing the means for insuring that raw materials are released from the feeding unit only when the closure on the gun which is moving to feeding position is open;

Fig. 14 is a detail view of the means for actuating the fork which operates the gun-closure clamping devices;

Fig. 15 is a vertical section on the line 15—15 of Fig. 8 showing the clutch for controlling the operation of the feeding unit D; and Fig. 16 shows a modified form of steam inlet cam by which the low and high steam pressures are obtained for the puffing process.

Figure 1:
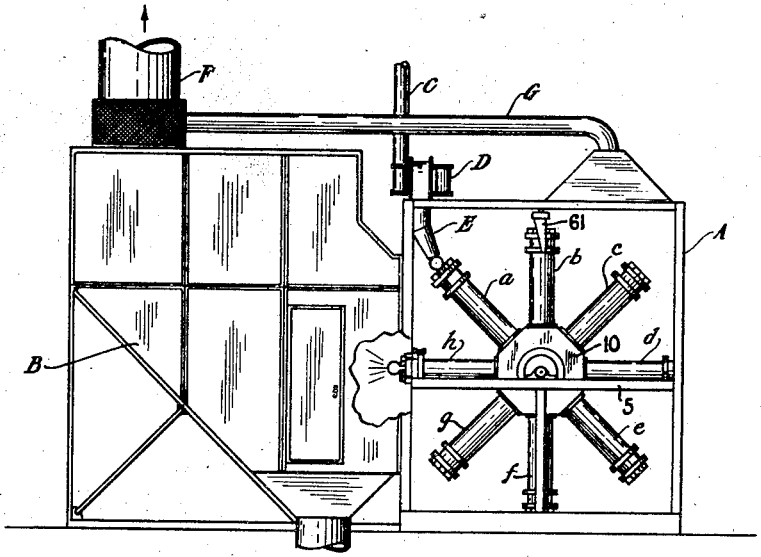
Fig. 1 is a front elevation of a complete unit showing the machine and its relation to the bin or hopper for receiving the cooked material.

Referring particularly to Fig. 1, the treating apparatus as a whole is indicated at A and the bin or hopper into which the guns discharge is indicated at B. The raw materials are fed into the treating chamber from a chute C through the intermediate loading device D and the spout E. As considerable steam is discharged in the bin with the explosion of each gun, it is essential that the steam be exhausted from the bin or it will condense on the walls and on the accumulated product. For this reason the bin is connected to an exhaust line F which has a branch G leading from the top of the treating unit to entrain steam which escapes from the guns.

The treating apparatus is housed within a substantially cubical frame composed of structural steel with a rectangular base 1, corner uprights 2 and a rectangular top 3. Intermediate uprights 4 are located on the sides of the framework and intermediate horizontal cross members 5 span the uprights at various points to form supports for the various parts of the mechanism.

Steam drum and treating chambers

Centrally located at the front of the machine is the rotating steam drum, indicated generally by the numeral 10. In the present showing this is octagonal so as to provide eight flat surfaces about the periphery of the drum, a gun or pressure cylinder, indicated generally by the numeral 12, being rigidly fastened to each flat surface on the drum. The number of guns and the configuration of the drum are optional.

The drum as shown in Fig. 5 is composed of a front plate 13, a rear plate 14 and the requisite number of face plates 15 which are all welded together to form a sturdy, steam-tight chamber divided midway of the drum by the central partition 16. This forms a chamber I at the left of Fig. 5 which is the inlet chamber and a chamber O at the right which is the outlet chamber. At the rear of the drum is attached the plate 18 in which the end of the driving shaft 20 projects, a key 21 being inserted to drive the drum. The shaft 20 is supported in a bearing 22 on an intermediate cross member 5 and its rear end is received in a step bearing 23 on the rear cross member 5 (Fig. 8). On the opposite side of the drum is attached a second plate 25 of somewhat larger internal diameter in which is fixed the bearing sleeve 26 which is received in the bearing 28 on the cross member 5 at the front of the machine.

Fitting within the sleeve 26 is the steam outlet pipe 30 which is set into the front plate 13 of the steam drum, its outer end being let into the header 31 from which extends the exhaust line 32. Located within the pipe 30 is the smaller steam inlet pipe 34, the inner end of which is set in the partition 16 to deliver steam under pressure to the chamber I, the outer end of the pipe being connected to the steam inlet line 35.

The pressure admitted to the chamber I of the drum and thence to the several treating chambers may be varied within any suitable range dependent upon the nature of the material to be treated and the processing procedure to be followed.

Each gun or treating chamber 12 shown herein is a heavy steel cylinder, the lower end of which is tightly sealed by being bolted to one of the flat sides of the steam drum. Located near the base of the cylinder and above the steam outlet, to be described, is a perforated plate or grid 33 on which the material will rest.

As alternative means for introducing steam to the inner end of the chamber any of the devices shown in Figs. 5a to 5d inclusive, may be employed. In Fig. 5a the end of the pipe 82 is covered with a perforated plate 33a set against the inner wall of the chamber. In Fig. 5b a perforated ring or baffle 33b is employed, preferably in the form of truncated cone set in the wall of the chamber. In Fig. 5c the pipe 82 is provided with a long extension 33c parallel to the axis of the chamber, and perforated throughout its length. This form secures a direct distribution of the steam throughout the body of material. In Fig. 5d the pipe 82 is provided with a perforated ring or coil 33d located in the base of the chamber.

Each of the above forms of steam inlet has the advantage over the plate 33 in that the space beneath the plate 33 is eliminated and the entire chamber may be filled, thereby increasing the productivity of the machine.

At the upper end of each cylinder is fixed a flange ring 36 which is a four-section ring seated in a groove 37 near the mouth of the gun. This sectional ring is fastened together and clamped about the gun by the four bolts 46 shown in Fig. 11. Pivoted in a bracket 38 on the ring 36 is the arm 39 which carries the cap or closure 40 which closes the outer end of the cylinder. A copper gasket or some other suitable sealing means (not shown) may be provided to make as nearly a steamtight joint as possible.

It is essential that the closure be tightly and securely held during the treating operation against the high pressure within the treating chamber and for this purpose there are provided four sliding shoes or clamps 42 each having a nose 43 which is formed with a slight cam face so that as the clamps are projected over the rim of the closure, the latter will be forced with great pressure to its seat over the mouth of the chamber. Each shoe is fastened by pin 41 to the upper end of a lever arm 44 which is located in a notch cut in the ring 36 and pivoted on the bolt 46. Set screws 45 are threaded into the outer face of each shoe and bear against the levers 44, permitting adjustment, to take up any wear at the point 43. Each lever arm extends downwardly along the side of the cylinder and at its lower end is located the cam roller 48.

Each of the rollers 48 is received in a cam slot 50, the contour of which is shown in Fig. 11, cut in the body of the rotating cam ring 52. This cam ring is mounted for rotary movement about the cylinder on a rib 53 located on the cylinder and is held in place by a lock ring 54. Each cam ring is provided with two oppositely positioned pins 55 by which it may be turned to clamp or release the closure in the manner to be later described. When the cam ring is moved in the direction of the arrow m in Fig. 11 into the position shown in Fig. 11, a powerful squeeze is exerted by the shoes 42 against the outer face of the closure through the pivoted levers 44, sealing the end of the treating chamber. On reverse movement of the cam ring in the direction of the arrow n, the locking shoes are withdrawn and the closure flies open due to the accumulated pressure within the cylinder. The total angular movement of the cam ring is relatively small as indicated by the extent of the cam slots 50, but when in locked position the pins are in the plane of rotation so that they will be in position to be opened by the trip arm to be described.

Steam drum cycle

Figure 3:
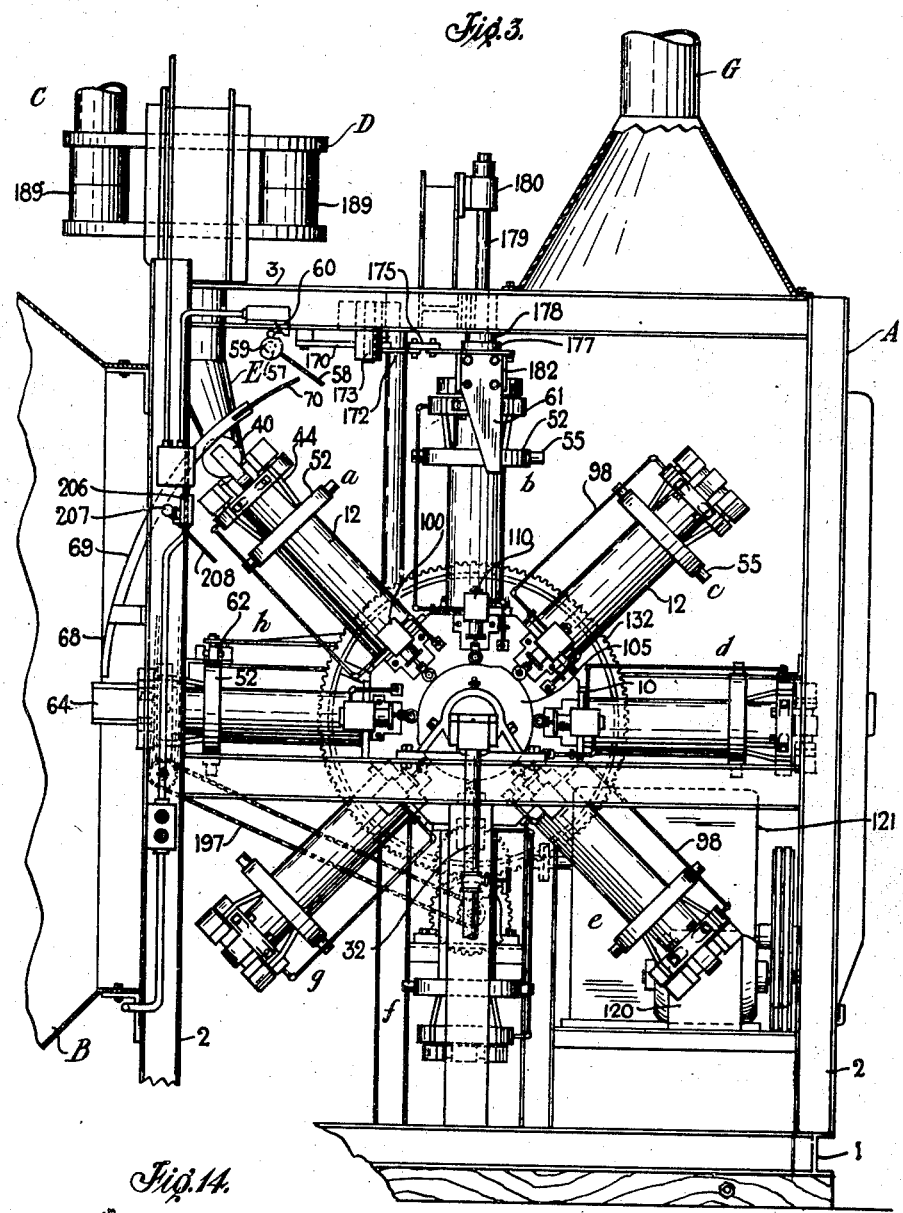
Fig. 3 is a front elevation of the machine.

Referring to Fig. 1 and in more detail to Figs. 3, 6 and 7, the rotating steam drum 10 is intermittently driven fractions of its complete revolution so that each treating chamber occupies several positions or stations during its complete cycle. The number of stations is somewhat arbitrary and the complete cycle may be divided into more or less stations, but for the purpose of showing a preferred embodiment of the invention, the machine has eight stations. It will be noted that the positions in Fig. 7 correspond to the positions in Figs. 1 and 3, but in Fig. 6 the positions are reversed owing to the fact that Fig. 6 is taken in the obverse direction to the other views.

At the first or a station, the cylinder 12 is positioned at an upwardly inclined angle of 45° directly below the feeding spout E. At this point the closure 40 is held in raised position to permit a measured charge of raw material to enter the cylinder. The mechanism for feeding the material will be described later, it being noted that if the closure is not open but has fallen back on the top of the cylinder, the feeding unit is automatically stopped so as to prevent waste of the raw material. Between the a and b stations, the closure drops over the mouth of the gun and at b position the cam ring 52 is rotated to clamp the closure securely in position.

Between the a and b position is located an arm 58 attached to the rockshaft 57. The lower end of this arm just clears the top of the closure if it has fallen to its proper seating position. It sometimes happens that particles of the material may lodge on the top of the gun and prevent the closure from fully closing. In such case the arm 58 will be struck by the partially opened closure and rocked upwardly. A cam 59 attached to the rockshaft 57 thereupon moves a safety switch 60 which is located in the power line so that if the arm 58 does not clear the closure the rotation of the drum will be stopped instantly. This is a simple form of safety device which will insure that the closure is correctly seated before it reaches b station.

The actuation of the cam ring 52 in the direction of the arrow m in Fig. 11 is performed by the fork 61 which, in idle position, is located so that it spans the end of the cylinder and the cam ring 52. When the cylinder is stopped in b position, the fork 61 is oscillated through an arc of somewhat over 90°, striking the pins 55 and actuating the levers 44 in the manner described.

As the cylinder moves to its next or c position, the inlet and outlet valves for the steam are opened by a cam mechanism to be described and both valves remain open as long as may be necessary to complete the steaming operation. In the embodiment shown, this same condition is maintained until the cylinder reaches g position, whereupon the steam outlet valve is closed while the inlet valve remains open. The inlet valve is kept open until the h position is reached, thereby building up the pressure within the treating chamber. At h position the steam inlet valve is first closed and immediately thereafter the sliding trip arm 62 strikes the top pin 55 and moves the cam ring in the direction of the arrow n in Fig. 11, which releases the closure and the contents of the cylinder are exploded and discharged.

To break the violent opening of the closure 40, a resilient bumper 64 (Fig. 12) is mounted on the frame of the machine. To prevent rebounding of the closure the arm 39 is provided with a tooth or lug 65 in the path of which is located the catch 66 pivoted at 67 on the frame and urged into locking position by the spring 68a. As the cylinder moves to a station for the next cycle of operation, the lid frees itself from the catch 66.

Located in the path of the open closure as it frees itself from the catch 66 is a fork 68 which, under normal conditions, will catch the closure and conduct it into a holding track 69 which engages the top of the closure, as shown in Fig. 3, and holds it raised and in open position until it passes the station a. Beyond that point the track is provided with a curved tailpiece 70 which moves the closure from its vertical position so that it will fall over the mouth of the cylinder.

The steaming and pressure valves

The steam from the inlet chamber I passes to each of the several treating chambers through a pipe 75 (Figs. 5 and 6) which leads to a valve casing 76 located on a bracket 77 attached to the rear wall 14 of the steam drum. In the casing is located a valve the stem 78 of which rests upon a lever 80 pivoted to the lower end of the bracket 77. From the casing the steam is admitted by pipe 82 to the inner end of the treating chamber below the grid 33, or by any of the alternative devices shown in Figs. 5a to 5d inclusive.

The lever 80 carries a roller 84 which rides on the edge of a cam 85 formed on the sleeve 86 which fits loosely about the shaft 20. The cam is held by bolts 87 which are located in the framework. It will be noted that the cam 85 is provided with a removable section or gate 88 so that it may easily be removed from the machine and replaced by a cam of a different contour. This enables the machine to be adaptable for differing methods of treatment without having to tear down the machine.

It will be noted that from station $h$ to slightly past station $b$ the roller 84 travels over the low portion of the cam and the inlet valve is closed.

As stated in an earlier portion of the description, it is ordinarily desirable to maintain the steam inlet valve open so as to maintain the maximum pressure up to the instant that the closure is released and as there is necessarily a pause as each cylinder reaches the $h$ station before the lid can be released, the steam would be shut off an appreciable interval before explosion of the contents if the simple cam 85 were employed. It has been found desirable, therefore, to provide an auxiliary device which will act to close the valve after the drum has paused with a cylinder at $h$ station and just the instant before the trip arm 62 throws the cam ring 52 to release position. The device which has been perfected for this purpose will now be described, particular attention being directed to Figs. 6 and 6a.

The stationary cam 85 has a receding surface 89 at the point opposite the $h$ position which is sufficient to close the valve. Adjacent this point on the cam 85 is a pivoted, spring-actuated lever 90 carrying a shoe 91. Lever 90 is provided with a roller 92 which rides on the surface of a constantly rotating cam 93 carried by the sleeve 95 rotatable about the shaft 20 and driven by the sprocket and chain 96. This cam is formed with a high surface $x$ which terminates in an abrupt shoulder $y$ leading to the low surface $z$. When the roller 92 is riding on the high surface of the cam 93, the face of the shoe 91 constitutes a continuation of the high surface of the cam 85. When the roller 92 drops over the shoulder $y$ the roller 84 is instantaneously dropped to the low surface $z$ of the cam 93 and the valve is closed.

The rotation of the cam 93 is so timed that as each pressure chamber reaches the $h$ position, the roller 84 passes on to the surface of the shoe 91 and is held in this position until the instant before the trip arm strikes the pin 55 and at this moment the shoulder $y$ passes from beneath the roller 92. By this means high pressure is maintained in the treating chamber up to the instant of explosion.

For the production of puffed products it is necessary only to modify the cam which controls the steam inlet valve and to increase the pressure on the steam inlet line 34 so that the maximum pressure in the steam drum will be high enough to secure a puffed product when the guns are exploded. Such a modified cam is shown in Fig. 16, being indicated by the numeral 285. This cam has a zone $i$ in which the rollers 84 are lowered to shut off the several valves and an intermediate zone $ii$ in which the valves are partially opened so as to admit a sufficient quantity of steam to supply a relatively low pressure in the several treating chambers just beyond the station $b$. Through the stations $c$, $d$, $e$ and $f$, the steam is throttled down to maintain the low pressure during the cooking period. Just beyond the station $f$ the cam is raised to hold the valves in fully opened position through the zone $iii$, thereby admitting full steam pressure to the chambers, and this condition is maintained to the station $h$. The relative extent of the low and high pressure zones $ii$ and $iii$ may be modified to obtain any desirable relation between the low and high pressure periods. The operation of the cam 93 and the shoes 91 to close the valves is the same as in the foregoing description.

Referring to the steam outlet valves:

The steam passes through the grid 33, thoroughly permeates the charge of raw material in each treating chamber and passes out of the chamber through the pipe 98 set in the flange 36 at the top of the chamber. The several pipes 98 extend toward the center of the steam drum and are connected to an outlet valve casing 100 mounted on a bracket 101 carried by the outside plate 13 of the steam drum. The outlet valves are provided with stems 103, the lower ends of which rest upon pivoted levers 104 carried by the brackets 101. Rollers 109 on the levers 104 ride on the surface of the fixed cam 105. It will be noted that the high portion of the cam, which opens the valves, begins at a point just beyond station $b$, corresponding to the point at which the inlet valves are opened, and continues until the station $g$ is reached. During the travel from station $g$ to station $h$ and the interval before the trip arm operates to open the pressure chamber, the outlet valve is closed to allow the pressure to build up in the treating chamber.

It will be noted that the cam 105 is also provided with a removable section or gate 106 so that it may be readily removed and replaced with a different contour cam in the event the steaming period is to be modified. The cam is placed over the sleeve 26 and lies between the plate 25 and a shoulder 108 formed on the sleeve 26. To hold the cam stationary, two dowel plates 110 are attached to the bearing 28, the dowel pins 111 entering the cam as shown in Fig. 7.

From each valve casing 100, the steam is returned to the chamber 0 in the steam drum through a return pipe 112. The pipe 112 discharges into a nipple 113 (Fig. 5) set in the wall 13, the end of the nipple being formed with a T-shaped outlet so as to direct the steam away from the partition wall 16. It was found that steam discharged from the heating chamber with considerable force against the wall 16 would soon destroy the wall.

Driving mechanism

From the description which has been given, it will be seen that the steam drum is rotated intermittently in steps which constitute one-eighth of its complete cycle. The periods during which the drum is stationary are substantially twice as long as the periods during which it is moving, although by varying the ratio of the clutch actuating gears, to be described, the relative durations of the rest and motion periods may be altered.

The driving mechanism also oscillates the fork 61 through its arc to clamp the closure in position and return the fork to its inactive position during the pauses in steam drum travel. Also, the arm 62 is advanced to release the closure during this rest interval and these locking and unlocking elements 61 and 62 are actuated by the same device.

The machine also drives the raw material feeding device D and this operation is constant except when the closure of an approaching treating chamber is not open to receive the charge.

In addition, the rotating cam 93 is constantly driven to actuate the valves 76 for shutting off the steam supply.

The mechanism to perform these various operations in correct timed relation will now be described, special reference being made to Figs. 8 and 9.

Power is supplied from a motor 120 located at the rear of the machine and connected by a belt drive to any suitable transmission indicated by the numeral 121. This transmission is preferably of the type by which the speed of the machine may be controlled and adjusted accurately so that the apparatus may be adapted to a wide variety of raw materials which may require varying overall periods of treatment. For this purpose the standard type of adjustable belt and pulley drive known as the "Reeves" drive has been employed.

The main power shaft, which is constantly driven from the transmission unit, is indicated by the numeral 124. Keyed to this shaft is a gear 125 which meshes with a gear 126 attached to the countershaft 127. Countershaft 127 is provided on its front end with a cam 130 which controls the step-by-step rotation of the steam drum. The shaft 20 of the steam drum is fixed to a large gear 132 which is driven by the pinion 133 rotatably mounted on the forward end of the shaft 124. To this pinion 133 is connected a one-revolution and stop clutch of any preferred type, indicated in general by the numeral 135. The clutch actuating dog is indicated at 136 and is engaged by the hooked end of the pivoted lever 137. On the surface of the clutch is the notch 138 which is engaged by the end of a locking lever 140 paralleling the lever 137, both levers being pivoted on the shaft 142. An operating pin 143 is fixed in the lever 137, but has a slotted engagement with the lever 140, both levers being forced upwardly by spring means indicated at 145. Between the levers and connected thereto by the pin 143 is the vertical operating link 146 which is connected at its upper end to the rocker arm 148 pivoted at 149 and having a roller 150 which rides over the surface of the cam 130.

The gear ratio between the gears 132 and 133 is such that for each complete revolution of the gear 133, the steam drum will turn through one-eighth of its complete cycle. The gear ratio between the gears 125 and 126, however, is approximately 1 to 3 which determines the relation between the periods of rest and motion for the steam drum. When the nose on the cam 130 elevates the roller 150 and its rocker arm, the lever 137 will be depressed, releasing the clutch dog 136 and permitting the clutch to operate for a single revolution. The lever 140 will engage the notch 138 as the clutch completes its single revolution and hold the steam drum in its stationary position.

Figure 2:
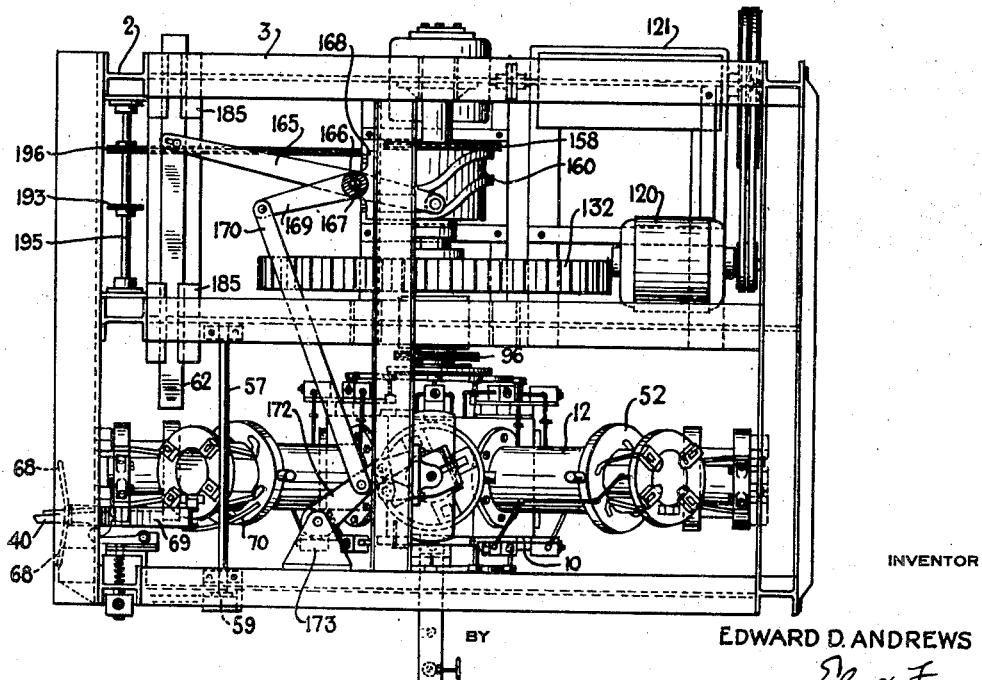
Fig. 2 is a plan view of the machine.

For actuating the fork 61 and trip arm 62, the shaft 124 carries a sprocket 155 which through a chain 156 drives a sprocket 158 secured to a large barrel cam 160 which is rotatably mounted on the shaft 20 at the rear of the bull-gear 132. On the surface of the cam is the cam track 162, the major portion of which is parallel to the plane of rotation, during which time the parts 61 and 62 are inactive. During the period when the steam drum is stationary, the curved part of the cam shown in Fig. 8 comes into action. Engaging the cam is a roller 164 mounted on the end of an arm 165 which is secured at a midway point to a vertical pipe or stanchion 166 which is mounted on a rod 167 which is supported between a bracket 168 on a cross member 5 and the top of the frame. Near the top of the stanchion 166 is fixed the lever arm 169 which is connected by link 170 with the rocker arm 172 carried by the bracket 173 at the top of the frame (Fig. 2). The outer end of the arm 172 is connected by a link 175 to a rocking yoke 176 having a large central opening which is clamped about a sleeve 177 mounted for rotation on the vertical shaft 179, the upper end of which is journaled in a bearing 180 at the top of the frame (Fig. 14). The lower end of the sleeve 177 is fixed to an I-shaped crosspiece 182 to the outer ends of which are attached the depending arms of the fork 61.

The rocker arm 165 is extended to the left side of the machine where it has a pin and slot engagement with the trip arm 62 which is guided in its horizontal movement in blocks 185 located on the framework.

The configuration of the cam and the design of the lever mechanism is such that when the fork is operated to clamp the closure onto the end of the gun the fork will advance rapidly to the point where it engages the pins 55 and then the angle of the cam is reduced so that the final locking squeeze will be imparted more slowly but more powerfully. Also, the trip arm is advanced rapidly to a point where it is just short of engagement with the pin 55, the release of the closure on the gun at $h$ station during the last portion of travel of the trip arm being simultaneous with the locking of the closure at the $b$ station.

For rotating the valve shut-off cam 93, the shaft 124 is extended beyond the pinion 133 and carries a sprocket which drives the chain 96.

The feed device

The feeding device for delivering the measured charges of raw material may be of any standard design. That shown in the drawings is a rotating series of cells or pockets 189 which receive the charge from the chute C at one point and deliver it to the feed spout E at another point. The rotation of the feeder D is so timed that one of the cells 189 discharges into the gun which is at rest in the $a$ position.

Figure 4:
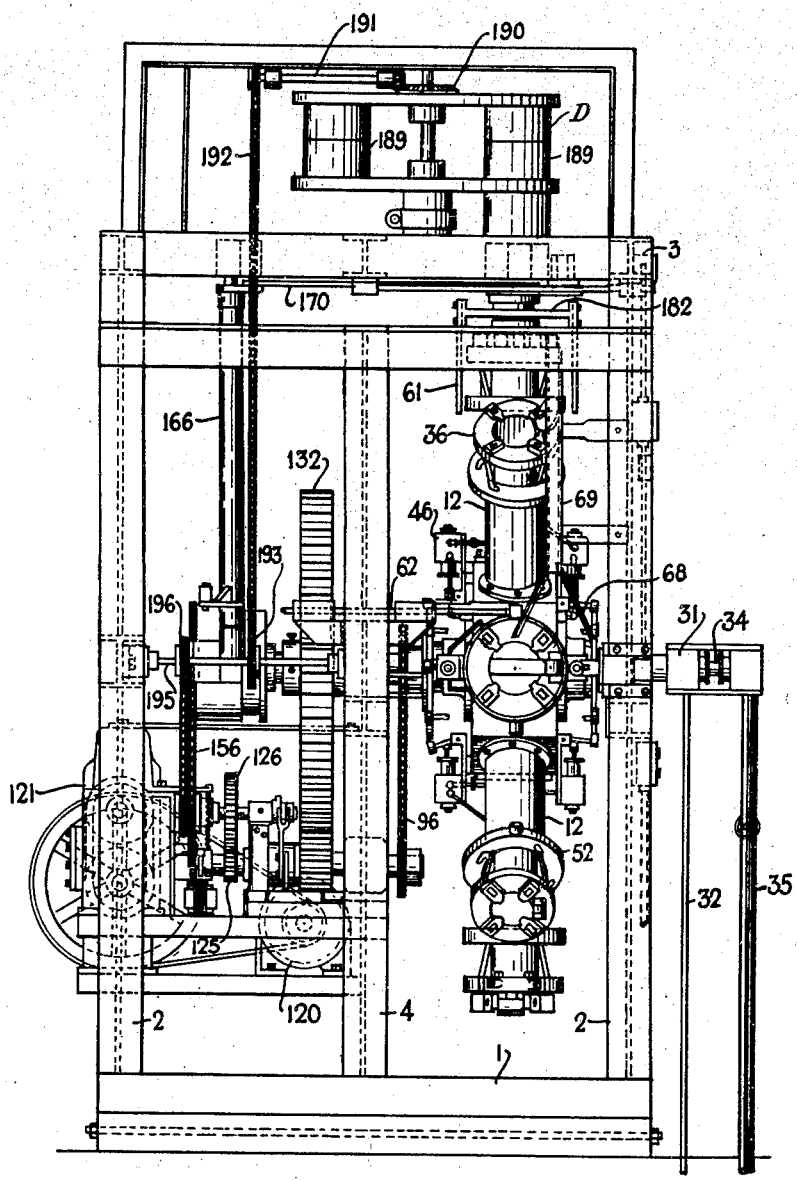
Fig. 4 is a side elevation looking toward the right of Fig. 3.

The feeder D is propelled by a bevel gear 190 (Fig. 4) which is driven by the horizontal shaft 191 rotated by the chain 192 which engages the sprocket 193 on the countershaft 195. The shaft carries a second sprocket 196 which is driven by chain 197 from a sprocket 198 located on the driven member of a clutch 200 rotatably mounted on the continuously moving countershaft 157. The driven member 200 is disconnected from the shaft by a releasable dog 201 (Fig. 15) which is engaged by a spring-actuated, retractible trip lever 202. The lever 202 is held in position to engage and trip the clutch by the spring 203, but is retracted by the armature 205 of a solenoid 204. In normal operation the solenoid is energized just before the dog 201 reaches the lever 202 so that its attached armature 205 withdraws the lever 202 and permits the member 200 to continue its rotation with the shaft 157.

So long then as the solenoid is periodically energized, the clutch 200 will remain in driving engagement and the feeding device continue to operate. The current to the solenoid is supplied through a normally open switch 206 located on the frame near and just ahead of the $a$ station (Figs. 3 and 13). This switch is yieldingly pressed against a rotating cam 207 which is connected to a feeler arm 208 which projects in the path of the closure as it moves toward $a$ station. It will be noted from Fig. 12 that when the closure is open, the shoulder 65 projects beyond the side of the chamber and this is the part which strikes the feeler arm 208 to rotate the cam and actuate the solenoid just as the clutch 200 would otherwise be released. By this arrangement, so long as the closures are raised as they pass from $h$ station to $a$ station, the feed device will continue to operate, but if a closure is not open, the arm 208 will not be rocked and the trip lever for the clutch 200 will remain in position to engage the clutch releasing dog and the operation of the feed device will be stopped until the next open closure passes beneath the arm 208.

A detent indicated at 210 is pivoted on the frame at 211 in position to engage a pin 212 on the clutch so as to prevent backward movement of the clutch member 200 when its forward movement is arrested by the trip lever 202.

Résumé

Machines constructed in the manner which has just been described have gone into actual and highly successful production of pressure cooked and exploded food products. It will be appreciated that the description has been detailed in order to enable the principles of operation to be fully understood. The term "treating" as used in the claims is intended to cover either pressure cooking and exploding or puffing. It is obvious that many of the details may be altered and modified or perfected without in any manner sacrificing the principles of the invention.

The operation of the machine will be briefly reviewed.

As each pressure chamber or gun, as it is more commonly called, stops at the first station of the cycle, it receives its charge of raw material. The rotating steam drum then moves to the point where the cover is closed and clamped in position. The inlet and outlet valves are then opened and the circulation of steam at high pressure is continuous and uninterrupted during the succeeding portion of the cycle until the outlet is closed. Preferably, the inlet valve is kept open for the pressure build-up until the chamber comes to rest in the last position of the cycle. The exact timing of the valves which control the inlet and outlet of steam and the relative periods when the valves are open is subject to wide variations depending upon the materials being treated and the results desired.

In the modified form of the invention for "puffing" as distinguished from pressure cooking, the arrangement is such that the materials are treated first to a low steam pressure and finally to a high steam pressure immediately before the chambers are opened which produces puffed wheat or puffed rice or other puffed products.

At the last station the cover clamping means is released and the explosion clears the pressure chamber for the next charge. The provision of means for holding the inlet valve open until the instant of explosion is a valuable feature of the invention.

The various adjuncts which have been described for feeding the raw materials, storing the finished product, insuring that the raw materials be not wasted, that the operation be stopped if the cover is not properly closed, the design of the driving mechanisms and the cover clamping and release devices are all important and contribute to the successful operation, but these parts and other parts not specifically mentioned may be varied in design and construction.

What is claimed is:

1. A machine for treating starch-containing materials, comprising a movable support, a pressure chamber on the support, means for supplying a charge of raw material to the chamber at one point in the cycle of the support, a closure, means for closing the closure over the mouth of the chamber, means for continuously circulating steam through the chamber after the closure is made and during the movement of the support, means for shutting off the steam prior to the end of the cycle, and means for releasing the closure thereafter.

2. A machine of the character described, comprising a support, pressure chambers on the support, said support having a cycle of movement during which the contents of the chambers are treated, means for supplying a charge of raw material to a chamber at one point in its cycle, means for closing the chamber after the charge is in the chamber, a steam inlet and a steam outlet to the chamber, a valve at the inlet and a valve at the outlet, means for opening both said valves after the chamber is closed, means for closing said valves, and means for opening the chamber.

3. A machine of the character described, comprising a support, pressure chambers or the support, said support having a cycle of movement during which the contents of the chambers are treated, means for supplying a charge of raw material to a chamber at one point in its cycle, means for closing the chamber after the charge is in the chamber, a steam inlet and a steam outlet to the chamber, a valve at the inlet and a valve at the outlet, means for opening both said valves after the chamber is closed, means for closing the outlet valve at a later point in the cycle, means for opening the chamber at the end of the cycle, and means for closing the inlet valve immediately before the chamber is opened.

4. A machine of the character described, comprising a turret having a cycle of movement during which the contents are subjected to steam under pressure, a pressure chamber on the turret, means for supplying a charge of raw material to the chamber at one point in its cycle, means for closing the chamber at a later point in the cycle, a steam inlet pipe leading to the chamber and having a valve, a steam outlet pipe leading from the chamber and having a valve, means for opening both said valves immediately after the chamber is closed and holding them open during a succeeding portion of the cycle, means for closing the valves toward the end of the cycle, and means for opening the chamber at the end of the cycle.

5. A machine as described in claim 4 in which the outlet valve is closed prior to the closing of the inlet valve.

6. In a machine for treating raw food materials, comprising a movable steam box divided into steam inlet and outlet chambers, a plurality of pressure chambers carried by the box, steam conduits leading from the steam chambers to each pressure chamber, valves in said conduits, and means to hold each pair of valves for a chamber open during a portion of the cycle of the chamber and close said valves toward the end of the cycle.

7. A machine as described in claim 6 in which the outlet valve is closed prior to the closing of the inlet valve.

8. In a machine for the purposes set forth, comprising an intermittently rotated turret having a plurality of stations in its cycle of movement, a plurality of pressure chambers carried by the turret, means for supplying a charge of raw material to each chamber at one station, a closure for each chamber, means for clamping the closure over the mouth of the chamber at a second station, a conduit for admitting steam to each chamber, a valve in each steam inlet conduit, a second conduit for exhausting steam from each chamber, a valve in each steam outlet conduit, means for opening both said valves after the chamber passes the second station and holding said valves open during a substantial portion of the cycle, means for closing both said valves toward the end of the cycle, and means for releasing the closure at the last station in the cycle.

9. In a machine for the purposes set forth, comprising an intermittently rotated turret having a plurality of stations in its cycle of movement, a plurality of pressure chambers carried by the turret, means for supplying a charge of raw material to each chamber at one station, a closure for each chamber, means for clamping the closure over the mouth of the chamber at a second station, a conduit for admitting steam to each chamber, a valve in each steam inlet conduit, a second conduit for exhausting steam from each chamber, a valve in each steam outlet conduit, means for opening both said valves after the chamber passes the second station and holding said valves open during a substantial portion of the cycle, means for closing the steam outlet valve toward the end of the cycle, means for releasing the closure at the last station in the cycle, and means operative at the last station and just prior to the operation of the closure releasing means to close the steam inlet valve.

10. In a machine for the purposes set forth, comprising an intermittently actuated turret having a plurality of stations in its cycle of movement, a plurality of pressure chambers carried by the turret, means for supplying a charge of raw material to each chamber at the beginning of the cycle, a closure for each chamber, means for clamping the closure over the mouth of the chamber at one station, a conduit for supplying steam to each chamber, an inlet valve in the conduit, a second conduit for steam discharged from the chamber, an outlet valve in the second conduit, and means for opening both said valves after the chamber has passed the said station and holding the valves open during the subsequent travel of the turret to secure continuous circulation of steam through the chamber while the material is being processed.

11. In a machine for the purposes set forth, comprising an intermittently actuated turret having a plurality of stations in its cycle of movement, a plurality of pressure chambers carried by the turret, means for supplying a charge of raw material to each chamber at the beginning of the cycle, a closure for each chamber, means for clamping the closure over the mouth of the chamber at one station, a conduit for supplying steam to each chamber, an inlet valve in the conduit, a second conduit for steam discharged from the chamber, an outlet valve in the second conduit, means for opening both said valves after the chamber has passed the said station and holding the valves open during the subsequent travel of the turret to secure continuous circulation of steam through the chamber while the material is being processed, means to release the closure at the last station in the cycle, and means operative prior to the release of the closure to close the outlet valve and the inlet valve in the order named.

12. In a machine for the purposes set forth, comprising an intermittently actuated turret having a plurality of stations in its cycle of movement, a plurality of pressure chambers carried by the turret, means for supplying a charge of raw material to each chamber at the beginning of the cycle, a closure for each chamber, means for clamping the closure over the mouth of the chamber at one station, a conduit for supplying steam to each chamber, an inlet valve in the conduit, a second conduit for steam discharged from the chamber, an outlet valve in the second conduit, means for opening both said valves after the chamber has passed the said station and holding the valves open during the subsequent travel of the turret to secure continuous circulation of steam through the chamber while the material is being processed, means to release the closure at the last station in the cycle, means operative in advance of the last station for closing the outlet valve, and means operative when the chamber is at rest at the last station to close the inlet valve.

13. In a machine for treating food products, comprising a movable turret, a series of pressure chambers carried by the turret, a steam supply chamber and a steam exhaust chamber, permanent conduits from said steam chambers to the several pressure chambers, valves in said conduits, and cam means acting on said valves to open the valves and hold them open whereby the circulation of steam through the chambers is uninterrupted during the steaming period.

14. In a machine for treating food products, comprising an intermittently rotated turret, a series of pressure chambers carried by the turret, a steam supply chamber and a steam exhaust chamber, two sets of permanent conduits from said steam chambers to the several pressure chambers, inlet valves in one set of conduits and outlet valves in the other set of conduits, a stationary cam operable on rotation of the turret to open and close the outlet valves, and a second stationary cam operable to open the inlet valves.

15. In a machine for treating food products, comprising an intermittently rotated turret, a series of pressure chambers carried by the turret, a steam supply chamber and a steam exhaust chamber, two sets of permanent conduits from said steam chambers to the several pressure chambers, inlet valves in one set of conduits and outlet valves in the other set of conduits, a stationary cam operable on rotation of the turret to open and close the oulet valves, a second stationary cam operable to open the inlet valves, and trip means associated with the second cam to close the inlet valve when the turret is at rest.

16. In a machine for treating food products, comprising an intermittently rotated turret, a series of pressure chambers carried by the turret, a steam supply chamber and a steam exhaust chamber, two sets of permanent conduits from said steam chambers to the several pressure chambers, inlet valves in one set of conduits and outlet valves in the other set of conduits, a stationary cam operable on rotation of the turret to open and close the outlet valves, a second stationary cam operable to open the inlet valves, and a trip device acting on each inlet valve when its pressure chamber is at rest at the end of the cycle of rotation to close the inlet valve.

17. In a machine for treating food products, an intermittently rotated steam drum having a steam supply chamber and a steam exhaust chamber, a series of pressure chambers carried by the drum, means to charge the several pressure chambers at the beginning of the cycle, means to close the pressure chambers at a second point in the cycle, conduits from the steam chambers to the several pressure chambers, an inlet valve in each steam supply conduit, an outlet valve in each exhaust conduit, a stationary cam acting upon the outlet valves to open and close them and a second stationary cam acting to open the inlet valve, a trip mechanism operative during a dwell in the drum rotation to close the several inlet valves at the end of the cycle, and means to open the pressure chambers.

18. In a machine for treating food products, an intermittently rotated steam drum having a steam supply chamber and a steam exhaust chamber, a series of pressure chambers carried by the drum, means to charge the several pressure chambers at the beginning of the cycle, means to close the pressure chambers at a second point in the cycle, conduits from the steam chamber to the several pressure chambers, an inlet valve in each steam supply conduit, an outlet valve in each exhaust conduit, a stationary cam acting upon the outlet valves to open and close them and a second stationary cam acting to open the inlet valve, a trip mechanism operative during a dwell in the drum rotation to close the several inlet valves at the end of the cycle, and means to open the pressure chambers, said trip mechanism consisting of a movable shoe to hold the valve in open position and means to move the shoe to close the valve immediately prior to the opening of the pressure chamber.

19. In a machine for treating food products, a drum divided into two chambers, means for supplying steam under pressure to one of said chambers and means for exhausting steam from the other chamber, a series of guns located on the periphery of the drum, conduits leading from the steam pressure chamber to the several guns, inlet valves in said conduits, conduits leading from the several guns to the steam exhaust chamber, outlet valves in said second named conduits, stationary cams at the side of the drum, one of said cams operating the outlet valves and the other cam operating the inlet valves, and means to rotate the drum.

20. In a machine for treating food products, a drum divided into two chambers, means for supplying steam under pressure to one of said chambers and means for exhausting steam from the other chamber, a series of guns located on the periphery of the drum, conduits leading from the steam pressure chamber to the several guns, inlet valves in said conduits, conduits leading from the several guns to the steam exhaust chamber, outlet valves in said second named conduits, stationary cams at the side of the drum, one of said cams operating the outlet valves and the other cam operating the inlet valves, means to rotate the drum intermittently through several stations in a cycle, means at one of said stations to charge the guns with raw materials, means at another of said stations to clamp a closure over the mouth of each gun, and means at the last station in the cycle to release the closure on each gun as it reaches said station.

21. In a machine for treating food products, a drum divided into two chambers, means for supplying steam under pressure to one of said chambers and means for exhausting steam from the other chamber, a series of guns located on the periphery of the drum, conduits leading from the steam pressure chamber to the several guns, inlet valves in said conduits, conduits leading from the several guns to the steam exhaust chamber, outlet valves in said second named conduits, stationary cams at the side of the drum, one of said cams operating the outlet valves and the other cam operating the inlet valves, means to rotate the drum intermittently through several stations in a cycle, means at one of said stations to charge the guns with raw materials, means at another of said stations to clamp a closure over the mouth of each gun, and means at the last station in the cycle to release the closure on each gun as it reaches said station, both of said valves to a gun being opened from the time the gun passes the second named station until it approaches the end of the cycle.

22. A machine as set forth in claim 21 in which the inlet valve only remains open until the gun reaches the last station.

23. In a machine for treating cereals or the like, a movable gun support, a series of guns carried by the support, a closure on the end of each gun, means to load a charge of material in each gun at one point in the travel of the support, means operative to stop the feeding of material if the closure is not open when the gun reaches the loading point, means at a later point in the travel of the support to clamp each closure on the end of its gun, and means to introduce steam under pressure into the guns after the closures are clamped thereon and to release the closures at a still further point in the travel of the support.

24. In a machine for treating cereals or the like, a movable gun support, a series of guns carried by the support, a closure on the end of each gun, a movable transfer device to load a charge of material in each gun at one point in the travel of the support, means operative to stop the movement of the transfer device if the closure is not open when the gun reaches the loading point, means at a later point in the travel of the support to clamp each closure on the end of its gun, and means to introduce steam under pressure into the guns after the closures are clamped thereon and to release the closures at a still further point in the travel of the support.

25. In a machine for treating cereals or the like, a movable turret, a series of guns carried by the turret, a closure for the mouth of each gun, means to load each gun with a charge of raw material at one point in the cycle of the turret while the closure is open, means to shift the closure over the mouth of the gun after the loading operation, means at a further point in the cycle to clamp the closure against the mouth of the gun, means to rotate the turret, a device located between the loading and clamping points to arrest the movement of the turret if the closure is not properly seated over the end of the gun, and means operative at still further points in the travel of the support to introduce steam under pressure into the guns and to release the closures.

26. A machine for puffing starch-containing materials, comprising a movable support, a pressure chamber on the support, means for supplying a charge of raw material to the chamber at one point in the cycle of the support, a closure, means for closing the closure over the mouth of the chamber, means for maintaining steam in the chamber at a relatively low pressure during one portion of the cycle of the support after the closure is made and high pressure steam in the chamber during a succeeding portion of the cycle, means for shutting off the steam prior to the end of the cycle, and means for releasing the closure thereafter.

27. A machine for puffing starch-containing materials, comprising a movable support, a pressure chamber on the support, means for supplying a charge of raw material to the chamber at one point in the cycle of the support, a closure, means for closing the closure over the mouth of the chamber, means for continuously circulating steam through the chamber after the closure is made and during the movement of the support, means for increasing the steam pressure within the chamber during the cycle, means for shutting off the steam prior to the end of the cycle, and means for releasing the closure thereafter.

28. A machine of the character described, comprising a support, pressure chambers on the support, said support having a cycle of movement during which the contents of the chambers are treated, means for supplying a charge of raw material to a chamber at one point in its cycle, means for closing the chamber after the charge is in the chamber, a steam inlet and a steam outlet to the chamber, a valve at the inlet and a valve at the outlet, means for opening the outlet valve and partially opening the inlet valve after the chamber is closed, means for fully opening the inlet valve at a later point in the cycle, means for closing the valves, and means for opening the chamber.

29. In a machine for treating food products, comprising a movable turret, a series of pressure chambers carried by the turret, a steam supply chamber and a steam exhaust chamber, permanent conduits from said steam chambers to the several pressure chambers, valves in said conduits, and cam means acting on the inlet valve to open the inlet valve to a limited extent during a portion of the turret movement and to fully open the valve during another portion of turret movement.

30. In a machine for treating food products, comprising a movable turret, a series of pressure chambers carried by the turret, a steam supply chamber and a steam exhaust chamber, permanent conduits from said steam chambers to the several pressure chambers, valves in said conduits, cam means acting on the inlet valve to open the inlet valve to a limited extent during a portion of the turret movement and to fully open the valve during another portion of turret movement, and a second cam means to hold the outlet valve open during the steaming period.

31. In a machine for treating food products, a drum divided into two chambers, means for supplying steam at relatively high pressure to one of said chambers and means for exhausting steam from the other chamber, a series of guns located on the periphery of the drum, conduits leading from the steam pressure chamber to the several guns, inlet valves in said conduits, conduits leading from the several guns to the steam exhaust chamber, outlet valves in said second named conduits, a stationary cam at the side of the drum for operating the inlet valves, said cam having portions to open the valves to different degrees, and means to rotate the drum.

32. In a machine for treating food products, a drum divided into two chambers, means for supplying steam at relatively high pressure to one of said chambers and means for exhausting steam from the other chamber, a series of guns located on the periphery of the drum, conduits leading from the steam pressure chamber to the several guns, inlet valves in said conduits, conduits leading from the several guns to the steam exhaust chamber, outlet valves in said second named conduits, a stationary cam at the side of the drum for operating the inlet valves, said cam having portions to open the valves to different degrees, means to operate the outlet valves, and means to rotate the drum.

EDWARD D. ANDREWS.